June 6, 1933.  F. K. KILIAN  1,913,056
CASTER CONSTRUCTION
Filed April 3, 1931

INVENTOR.
Frederick K. Kilian
BY Bodell & Thompson
ATTORNEYS.

Patented June 6, 1933

1,913,056

UNITED STATES PATENT OFFICE

FREDERICK K. KILIAN, OF SYRACUSE, NEW YORK

CASTER CONSTRUCTION

Application filed April 3, 1931. Serial No. 527,501.

This invention relates to caster construction and particularly to the construction of antifriction swivel casters constructed partially of aluminum, or other metal which is not sufficiently hard to provide a suitable bearing surface.

Furniture, and particularly chairs, constructed of aluminum, are coming into increasing popularity. Manufacturers of such aluminum furniture require the casters used with such furniture to be constructed of aluminum. It is obvious that aluminum is not a suitable material from which to construct all parts of the caster and for use with such furniture it is sufficient if the visible portion of the caster is constructed of aluminum. Caster wheels of hard rubber or other such compositions are generally acceptable but the caster fork member must be constructed of aluminum.

The principal object of this invention is to devise a suitable construction for an antifriction swivel caster in which the swivel portion is constructed of aluminum, and a portion of hardened material mounted within the aluminum fork to provide a suitable bearing, or raceway for a ball bearing.

A further object of the invention is to provide a construction for antifriction swivel casters, which construction is similar to that disclosed in my copending application Ser. No. 511,814, filed January 28, 1931, but which is modified so that the fork may be constructed of aluminum, or other material which is unsuitable as a bearing surface.

Other objects and advantages of the invention will appear and will be pointed out as the description proceeds.

The invention consists in the novel features and in the combinations and constructions hereinafter set forth and claimed.

In describing this invention reference is had to the accompanying drawing in which like characters designate corresponding parts in all the views.

Figure 1:
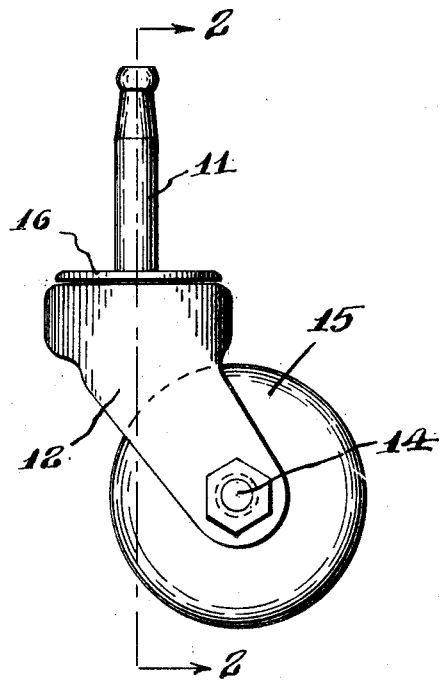
Figure 1 is a side elevation of a caster made in accordance with the invention.

This invention relates particularly to casters of the type shown in Figure 1 which are provided with a spindle 11 for attaching the caster to a piece of furniture. A fork 12 is rotatably mounted with respect to the spindle 11. An axle 14 is mounted in the fork 12 and a caster wheel 15 is mounted on the axle 14.

Figure 2:
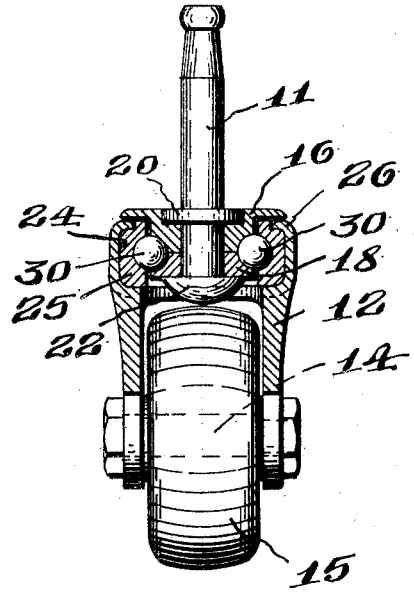
Figure 2 is a sectional view along the line 2—2 of Figure 1.
Figure 3:
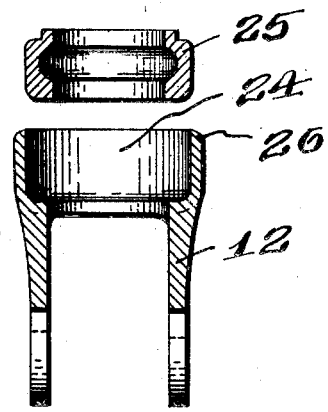
Figure 3 is a sectional view of certain parts of the caster shown in Figure 1 before these parts are assembled.

The caster is made up of a body portion which includes the spindle 11, an upper raceway member 16 and a lower raceway member 18. A shoulder or collar 20 is formed on the spindle 11 and the raceway members 16 and 18 are secured to the spindle 11 by riveting the lower end of the spindle 11 to form a head 22 which clamps the raceway members 16 and 18 against the collar 20 so that they form a complete inner raceway as shown in Figure 2.

The swivel portion of the caster includes the wheel 15, axle 14, and fork 12 which is provided with an outer raceway. The fork 12 is preferably constructed from a one-piece aluminum forging and is provided with a recess 24 at its upper end, which is concentric with the swivel axis of the caster. Since aluminum is not sufficiently hard to provide a satisfactory raceway for antifriction members, such as balls, hardened member 25 is inserted in the recess 24. The member 25 may be held in the recess in any suitable manner and according to the preferred embodiment of the invention is a press fit in the recess 24 and is further insured against displacement by turning over the upper end portion 26 of the fork 12. The hardened member 25 may be constructed of any suitable material which is of sufficient hardness to provide a satisfactory raceway for a ball bearing, and the material used in the preferred embodiment of the invention is hardened steel.

Antifriction members such as balls 30 are mounted in the raceways and these balls permit the swivel portion of the caster to swivel with respect to the body portion, but hold the swivel portion and body portion of the bearing assembled. The upper part of the upper raceway member 16 may be formed to project over the hardened outer raceway member 25 so as to protect the bearing from dust, as shown in Figure 2.

The invention is illustrated in its preferred embodiment but changes and modifications may be made without departing from the spirit of the invention as set forth in the appended claim.

What I claim is:

A swivel caster comprising a fork formed with an integral cup shaped head having an opening in its bottom, the margin of the bottom around the opening forming an annular shoulder, a bearing in the cup including an outer raceway fitting the side wall of the cup and thrusting against said annular shoulder, an inner raceway, and balls between the raceways, the outer raceway and the cup having interlocking means to hold the outer raceway from outward displacement, the inner raceway including upper and lower sections, and a marginal flange at the top of the upper section extending over the upper edge of the outer raceway and the cup, a spindle extending axially through and above the sections of the inner raceway and having a head at its lower end in the opening of the bottom of the head and thrusting against the lower face of the lower section and having a collar between its upper end and the head thrusting against the upper face of the upper section, and a wheel mounted in the fork.

In testimony whereof, I have hereunto signed my name, at Syracuse, in the county of Onondaga, and State of New York, this 31st day of March, 1931.

FREDERICK K. KILIAN.